United States Patent
Rysinski (10) Patent No.: US 8,072,520 B2
(45) Date of Patent: Dec. 6, 2011

(54) DUAL PINNED DIODE PIXEL WITH SHUTTER

(75) Inventor: Jeffrey Rysinski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1441 days.

(21) Appl. No.: 10/928,310

(22) Filed: Aug. 30, 2004

(65) Prior Publication Data

US 2006/0044243 A1 Mar. 2, 2006

(51) Int. Cl.
*H04N 3/14* (2006.01)
*H04N 5/335* (2011.01)
*H01L 27/00* (2006.01)

(52) U.S. Cl. ........ 348/296; 348/294; 348/302; 348/308; 250/208.1

(58) Field of Classification Search .................... 345/92; 348/294–324; 250/208.1; 257/359, 431–445
See application file for complete search history.

(56) References Cited

U.S. PATENT DOCUMENTS

| | | | | |
|---|---|---|---|---|
| 5,898,168 A * | 4/1999 | Gowda et al. | ............... | 250/208.1 |
| 6,141,050 A * | 10/2000 | Ackland et al. | ............... | 348/308 |
| 6,285,398 B1 * | 9/2001 | Shinsky et al. | ............ | 348/223.1 |
| 6,522,357 B2 * | 2/2003 | Beiley et al. | .................. | 348/296 |
| 6,556,244 B1 * | 4/2003 | So et al. | ........................ | 348/296 |
| 7,064,362 B2 * | 6/2006 | Roy | .............. | 257/225 |
| 7,067,792 B2 * | 6/2006 | Cazaux et al. | ............. | 250/214.1 |
| 7,105,793 B2 * | 9/2006 | Rhodes | ...................... | 250/208.1 |
| 7,332,786 B2 * | 2/2008 | Altice et al. | ................... | 257/445 |
| 2003/0103153 A1 * | 6/2003 | Fossum | ......................... | 348/308 |
| 2004/0036784 A1 * | 2/2004 | Bock | ............................. | 348/308 |
| 2005/0110093 A1 * | 5/2005 | Altice et al. | .................. | 257/359 |
| 2005/0110884 A1 * | 5/2005 | Altice et al. | .................. | 348/302 |
| 2006/0044243 A1 * | 3/2006 | Rysinski | ......................... | 345/92 |
| 2006/0146159 A1 * | 7/2006 | Farrier | .......................... | 348/308 |
| 2006/0243887 A1 * | 11/2006 | Boemler | .................... | 250/208.1 |
| 2009/0108176 A1 * | 4/2009 | Blanquart | ................. | 250/208.1 |
| 2009/0141155 A1 * | 6/2009 | Ellis-Monaghan et al. | .. | 348/308 |

FOREIGN PATENT DOCUMENTS

EP  1509038  *  1/2004

OTHER PUBLICATIONS

Chye Huat Aw, A 128×128 pixel standard CMOS image sensor with electronic shutter, Dec. 1996, IEEE Journal of Solid-State Circuits, vol. 31, pp. 1922-1930.*
Wany, M., "CMOS Image sensor with NMOS-only global shutter and enhanced responsivity," Jan. 2003, IEEE Transactions on Electron Devices, vol. 50, pp. 57-62.*

* cited by examiner

*Primary Examiner* — Jason Chan
*Assistant Examiner* — Michael Osinski
(74) *Attorney, Agent, or Firm* — Dickstein Shapiro LLP (57) ABSTRACT

A pixel having an electronic shutter suitable for use in a pixel array of an imaging device includes a pinned diode and a shutter transistor. The pinned diode is utilized as a storage device while the shutter transistor controls charge transfer from the electronic shutter. The use of a pinned diode as a charge storage device for the electronic shutter permits greater charge transfer efficiency, has lower leakage (or "dark" current), and permits the resulting pixel to have a greater fill factor than pixels utilizing conventional electronic shutter circuits.

33 Claims, 6 Drawing Sheets

DUAL PINNED DIODE PIXEL WITH SHUTTER

FIELD OF INVENTION

The present invention relates generally to semiconductor imagers. More specifically, the present invention relates to a pixel architecture supporting an electronic shutter.

BACKGROUND OF THE INVENTION

Figure 1:
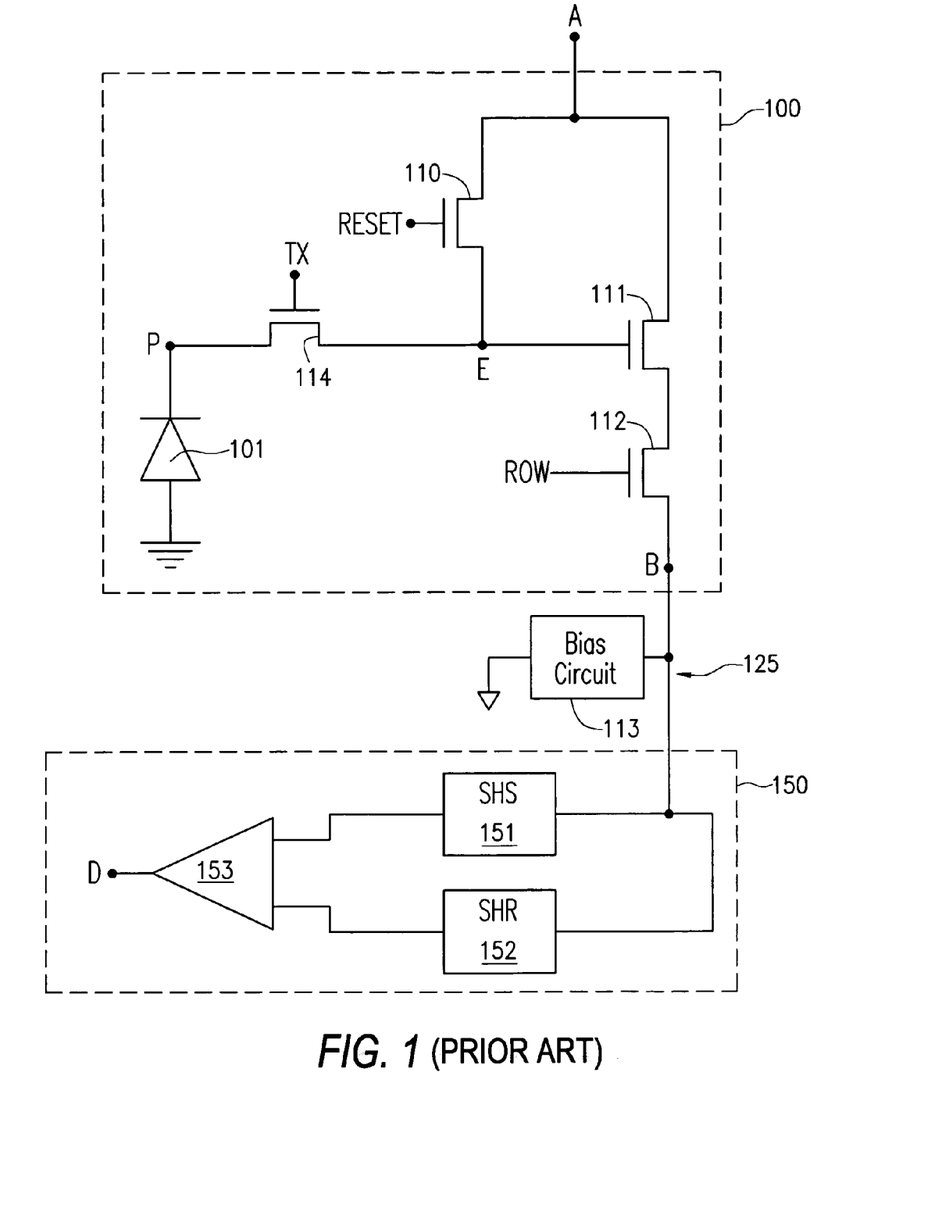
FIG. 1 illustrates a conventional pixel and associated pixel reading circuit.

FIG. 1 illustrates a conventional four transistor (4T) imager pixel 100 coupled via interconnect 125 to a conventional pixel reading circuit 150. The pixel 100 includes a photodiode 101, reset, source follower, row select, and transfer transistors 110-114, and nodes A, B, E, and P. Control signals RESET, TX, and ROW are respectively applied to the gates of the reset transistor 110, the transfer transistor 114, and the row select transistor 112. Node A is connected to a supply voltage source (VAAPIX) for the pixel 100. Node E is a charge storage node. Node P is a charge accumulation node of the photodiode 101. The outputs produced by the pixel 100 are made available at node B. These outputs include a reset output voltage Vrst and a pixel image signal output voltage Vsig. A bias circuit 113 biases a column line 125 between the pixel and a sample and hold circuit 152. The pixel reading circuit 150 includes a photo signal sample-and-hold (S/H) circuit SHS 151 for sampling and holding the Vsig output voltage, a reset signal S/H circuit SHR 152 for sampling and holding the Vrst output voltage, a differential amplifier 153, and nodes C and D. As illustrated, column line 125 couples the output of the pixel at node B to the input of the pixel reading circuit at node C.

The pixel 100 is operated by asserting the ROW control signal to cause the row select transistor 112 to conduct. The RESET control signal is asserted to cause a reset voltage from node A (e.g., VAAPIX) to be applied to charge storage node E. The RESET control signal is then deasserted. The pixel 100 outputs a reset signal Vrst through transistors 111 and 112, which is sampled and held by circuit 152. The photodiode 101 is exposed to light during a charge integration period, i.e., an exposure period. Upon completion of the integration, the accumulated charge is transferred to storage node E by transistor 114 (when TX is applied) causing the pixel 100 to output a photo signal Vsig through transistors 111 and 112 and sampled and held by circuit 151. Both the reset signal Vrst and the photo signal Vsig are output at node B, albeit at different times. During the exposure, the photodiode 101 produces a current related to the amount of incident light. Charge accumulates at node P based on the intensity of the incident light and the amount of time the transfer transistor 114 is non-conducting. When the transfer transistor 114 becomes conductive, the charge accumulated at node P is transferred through the transfer transistor 114 to storage node E.

As noted, the reset signal Vrst is sampled and held by the reset signal S/H circuit 152, while the photo signal Vsig is sampled and held by the photo signal S/H circuit 151. The sampled and held photo and reset signals are supplied as inputs to differential amplifier 153, which generates the signal (Vrst−Vsig). The resulting amplified output signal is available at node D for analog-to-digital conversion.

Figure 2:
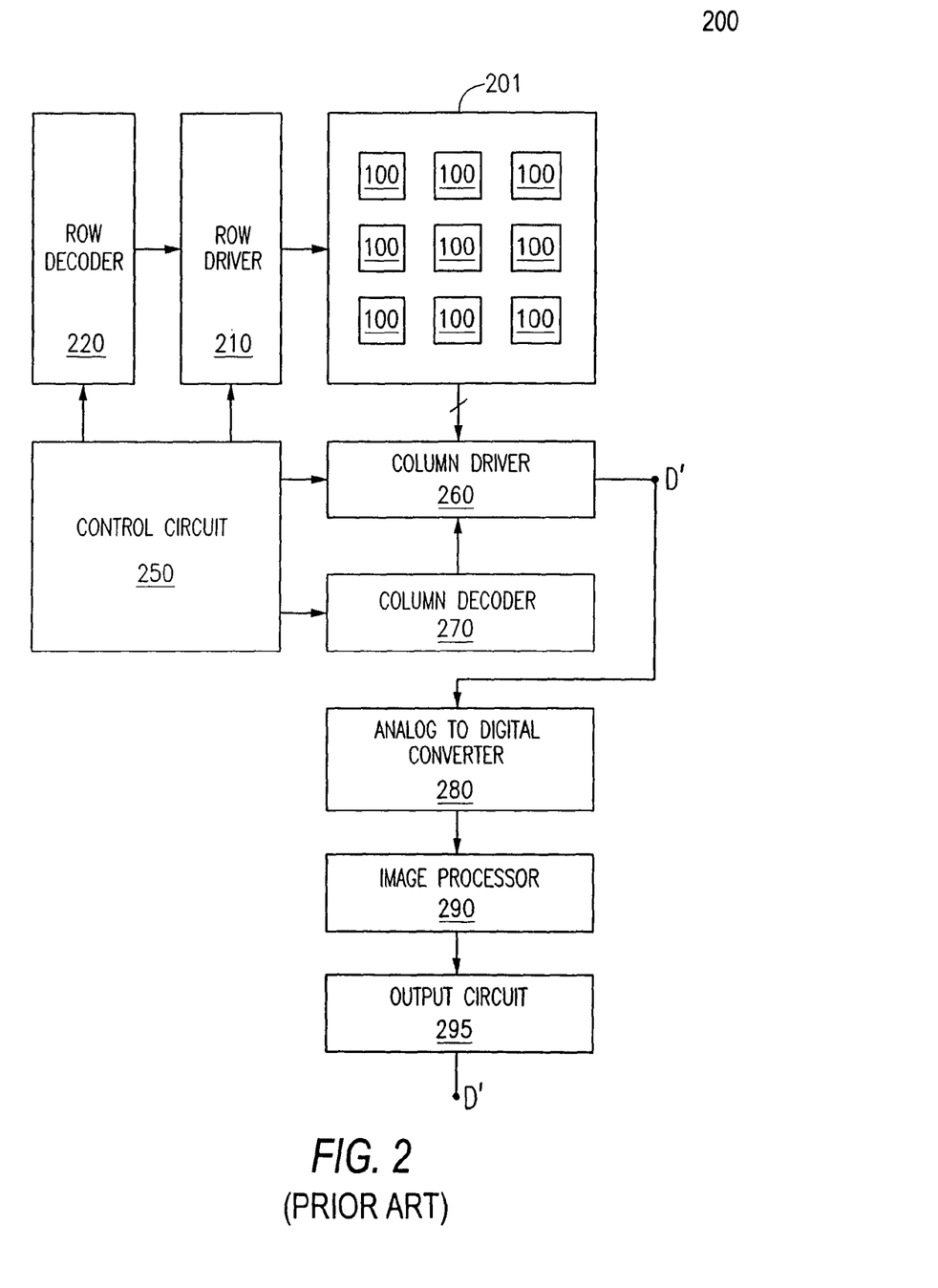
FIG. 2 illustrates a conventional imaging system.

FIG. 2 is a block diagram of an imager 200 having a pixel array 201. Pixel array 201 comprises a plurality of pixels 100 arranged in a predetermined number of columns and rows. Each pixel 100 of array 200 may have the architecture as shown in FIG. 1 or other well-known pixel architectures.

Typically, the imager 200 is operated on a rolling shutter basis, in which the rows of pixels are turned on at different times on a rolling basis; each pixel in a selected row respectively outputs its reset Vrst and photo Vsig signals at the same time. That is, a row of pixels from the array 201 is selected by the control circuit 250 by sending a row address from the control circuit 250 to the row decoder 220. The row decoder 220 decodes the row address and operates the row driver 210. The row driver 210 asserts the ROW control signal on a line coupled to the row select transistor 112 of each pixel in the selected row.

The assertion of the ROW control signal causes the row select transistor 112 of each pixel 100 in the selected row to conduct. As previously described with respect to the processing performed within each pixel, this permits each pixel 100 in the selected row to output its reset Vrst and photo Vsig signals at node B, and for the pixel reading circuit 150 associated with each pixel to output a corresponding signal at node D. The control circuit 250 operates the column decoder 270 to cause the column driver circuit 260 to select a column from the selected pixels. The output from node D of the pixel in the selected column of the selected row is routed via node D' to an analog to digital converter 280, which converts the output to a digital value. The digital value is processed by an image processor 290. Once the signals from each pixel of the selected row have been output, the control circuit 250 selects another row. This process is continued until every row of the array 201 has been processed. The imager 200 may include an output circuit 295 for outputting a digital signal corresponding to the complete image. The imager 200 may further include additional well known components, such as a lens assembly, which are not illustrated in order to avoid cluttering the figure.

The above described rolling shutter operation is not suitable for imaging scenes with objects having significant motion because each row is effectively imaged at a different time. In such scenes, an object may have moved significantly during the processing time between the different selected rows. Additionally, there is often a need to precisely control integration (i.e., exposure) time of a pixel on a frame basis. Control of the integration time on a frame basis would permit more accurate exposure, particularly of images having relatively bright and/or relatively dark areas. Some imagers utilize mechanical shutters, which may be difficult to control precisely. Other images utilize electronic shutters, which include storage capacitors. Although electronic shutters can be more easily controlled, the use of capacitors has some disadvantages including, for example, a decreased pixel fill factor, decreased efficiency in pixel charge transfer, and increased susceptibility to noise. Accordingly, there is a need for a pixel architecture that includes an electronic shutter control capable of operating in a full frame mode, but which is relatively immune to the known disadvantages associated with a pixel architecture featuring a capacitor.

SUMMARY OF THE INVENTION

Exemplary embodiments of the method and apparatus of the present invention provide a pixel architecture with an electronic shutter circuit comprising a shutter transistor and a pinned diode. The pinned diode is utilized as a charge storage device, while the shutter transistor is used along with a transfer transistor to control charge transfer from a photodiode to a source region coupled to the gate of a source follower transistor.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 3:
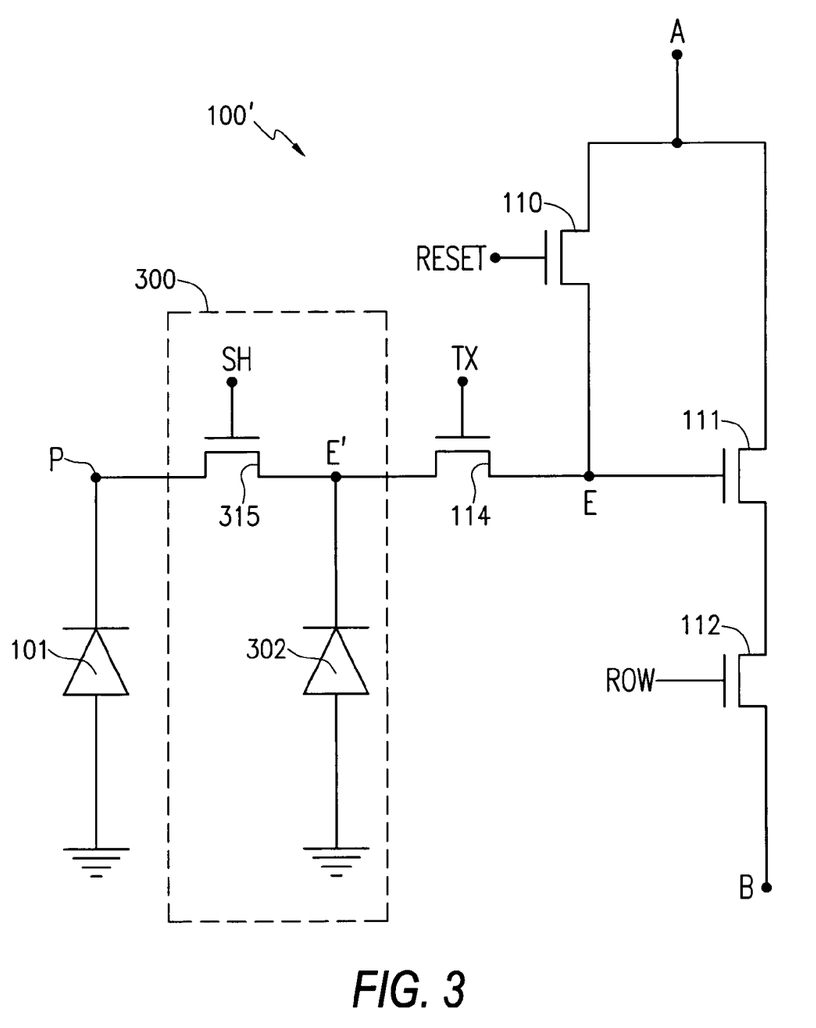
FIG. 3 illustrates a pixel in accordance with one embodiment of the present invention.

Now referring to the drawings, where like reference numerals designate like elements, there is shown in FIG. 3, a pixel 100' having an architecture in accordance with one embodiment of the invention. The pixel 100' includes several components found in pixel 100 (FIG. 1), but the illustrated pixel 100' includes additional circuitry in the form of an electronic shutter 300.

Node A of the pixel 100' is coupled to a voltage source, which is typically a pixel array supply voltage VAAPIX. Node B is an output node. The pixel 100' outputs its reset signal Vrst and the photo signal Vsig, at different times through node B.

The photodiode 101 is typically a pinned photodiode, and produces photo generated charges, the number of which varies in accordance with incident light. The photo generated charges accumulate at node P. Typically, the incident light arrives from a subject after being focused by a lens assembly (not illustrated).

The electronic shutter 300 includes a pinned diode 302 and a shutter control transistor 315. The shutter control transistor 315 has one source/drain coupled via node P to the photodiode 101 and another source/drain coupled to a charge storage node E'. The gate of the shutter control transistor 315 accepts a control signal SH. The control signal SH is used to control the conductivity of the shutter control transistor 315, and thus control whether photo generated charges accumulated at node P are transferred to the charge storage node E'. This shutter control is on a global basis for all imaging pixels of a pixel array.

The charge storage node E' is also coupled to the transfer transistor 114 and the pinned diode 302. The pinned diode is also coupled to a predetermined voltage source. The predetermined voltage applied to pinned diode 302 is illustrated as ground potential, however, the predetermined voltage can be any fixed potential, for example, the substrate voltage (Vss). The pinned diode 302 can be any type of pinned diode, but in one exemplary embodiment the pinned diode 302 is a pinned photodiode similar to photodiode 101. More specifically, the photodiode 101 receives incident light while the pinned diode 302 is blocked from receiving incident light. Accordingly, the photodiode 101 produces charges in response to incident light while the pinned diode, being opaque, does not.

The reset transistor 110 has its source and drain coupled between node E and supply voltage node A, while the source follower transistor 111 has its source and drain coupled in series between node A and a source/drain of the row select transistor 112. Another source/drain of the row select transistor 112 is coupled to node B. The source follower transistor 111 has its gate directly coupled to stage node E. The transfer gate transistor 114 acts as a switch to control the flow of charge from the charge storage node E' to node E and the gate of the source follower transistor 111. The shutter control transistor 315 acts as a switch between nodes P and E'.

Figure 4A:
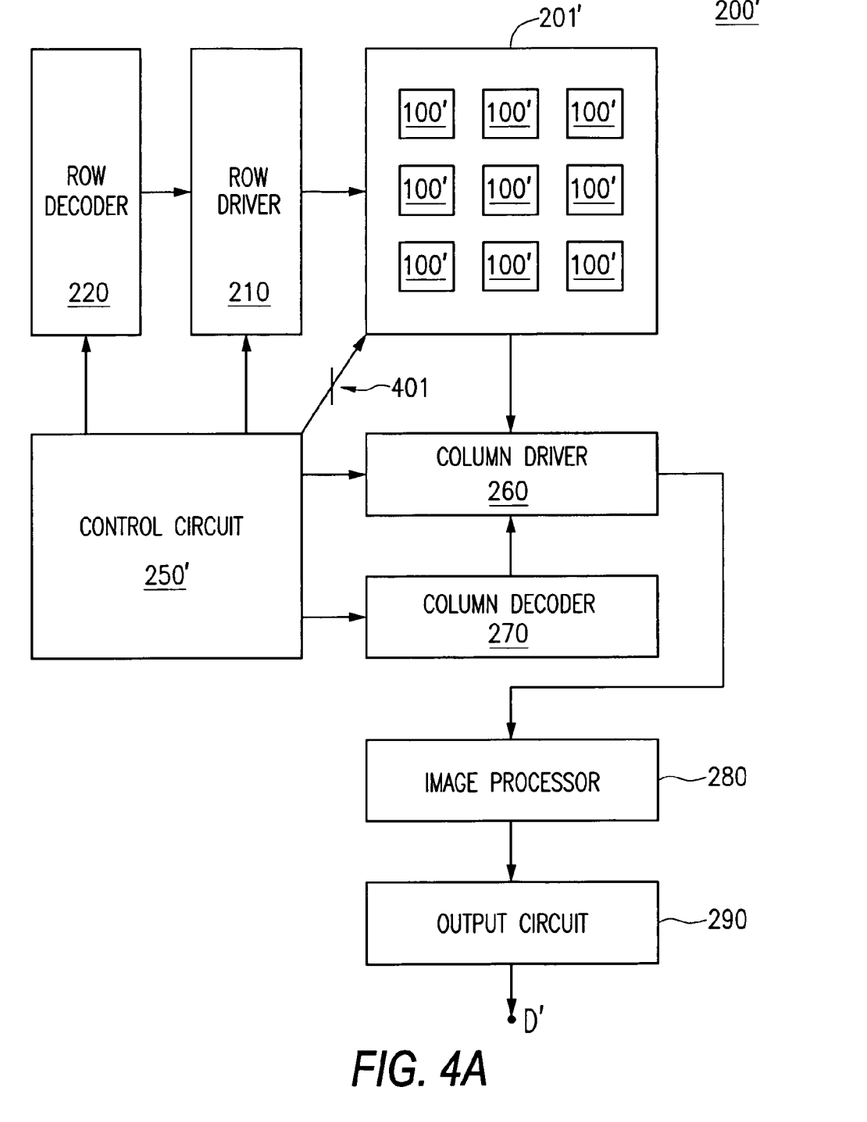
FIG. 4A illustrates an imager incorporating the pixel of FIG. 3.

FIG. 4A is a block diagram of an imager 200' constructed in accordance with one exemplary embodiment of the invention. The imager 200' includes similar components as imager 200 (FIG. 2). However, imager 200' features a pixel array 201' having the pixels 100' incorporating the electronic shutter 300. The imager 200' additionally includes a new control circuit 250', which may control the electronic shutter 300 by transmitting the control signal SH directly to the pixel array 201' via a control line 401.

Figure 4B:
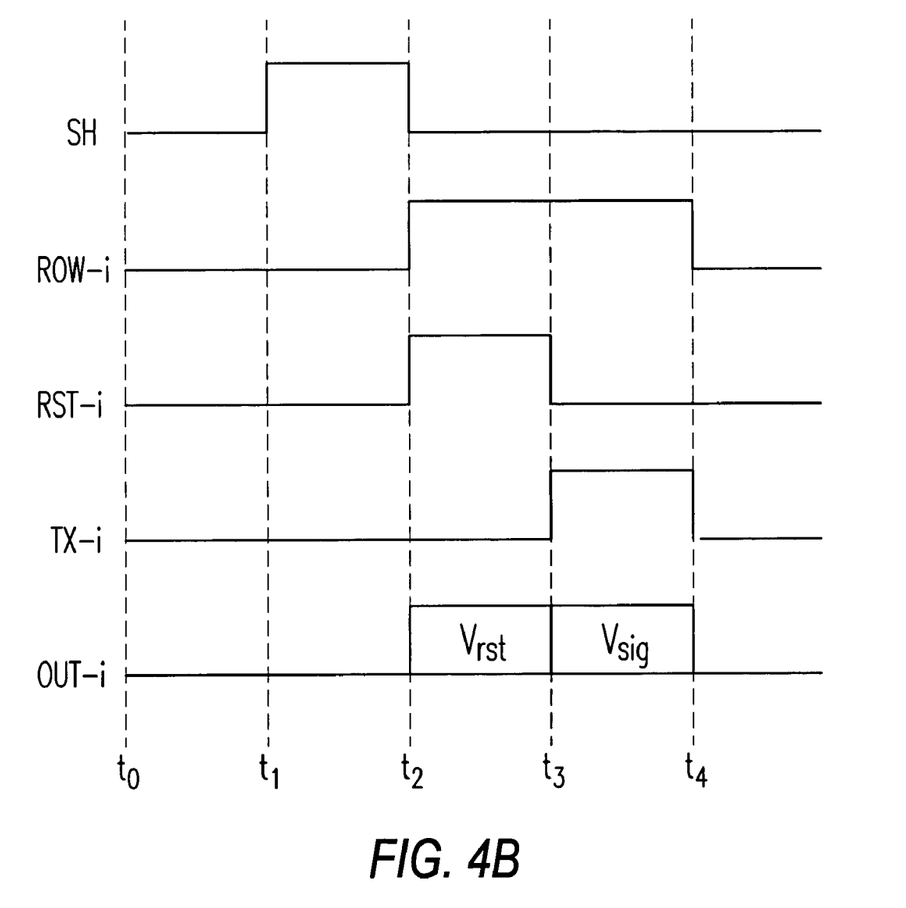
FIG. 4B is a timing diagram relating to the operation of the imager of FIG. 4A.

FIG. 4B is a timing diagram illustrating the timing sequence of control signals, which are controlled by the control circuit 250' to operate the imager 200'. The SH control signal is a global signal common to each shutter control transistor 315 of each pixel 100' in the pixel array 201'. The ROW-i, RST-i, TX-i, and OUT-i signals respectively represent the ROW control signal, RST control signal, TX control signal, and pixel output at node B of each pixel 100' in the selected row.

Time t0 denotes the beginning of imaging operations for a new frame and the start of the integration period. At time to each of the control signals SH, ROW-i, RST-i, TX-i is asserted low and there is no pixel output OUT-i.

Time t1 denotes the beginning of the global charge transfer period. The SH control signal is asserted high, causing the shutter control transistor 315 in each pixel 100' of the pixel array 201' to conduct. This permits, in each pixel 100', photo generated charges that were accumulated during the integration period to be transferred to the charge storage node E'.

Time t2 denotes the end of the global charge transfer period. The SH control signal is asserted low, causing the shutter control transistor 315 in each pixel 100' of the pixel array 201' to not conduct. As a result, any additional photo generate charges produced after time t2 are not added to the charge already accumulated at node E'. The new integration time starts once the SH control signal goes low.

Time t2 also denotes the beginning of a row read out operation. Accordingly, the ROW-i control signal is asserted high, causing the row select transistor 112 in each pixel 100' of the selected row to conduct. Simultaneously, the RST-i control signal is also asserted high, causing the reset transistor 110 of each pixel 100' in the selected row to conduct. As a result, each pixel 100' in the selected row outputs a reset signal Vrst at node B.

At time t3, the RST-i control signal is asserted low while the TX-i control signal is asserted high. As a result, the reset transistor 110 in each pixel 100' of the selected row stops conducting and the transfer transistor 114 of each pixel 100' of the selected row begins to conduct. As a result, in each pixel 100' of the selected row, the charge accumulated during the integration period, which was stored at node E', is coupled to the gate of the source follower transistor 111, causing each pixel 100' of the selected row to output the photo signal Vsig.

Time t4 denotes the end of row read out for the selected row. The ROW-i and TX-i control signals are each asserted low, causing the row select transistor 112 and transfer transistor 114 of each pixel 100' in the selected row to stop conducting.

The operations described above between time t2 and time t4 can then be repeated for a different one of the plurality of rows in the pixel array 201', until each row in the pixel array 201' has been read as described above.

Figure 5:
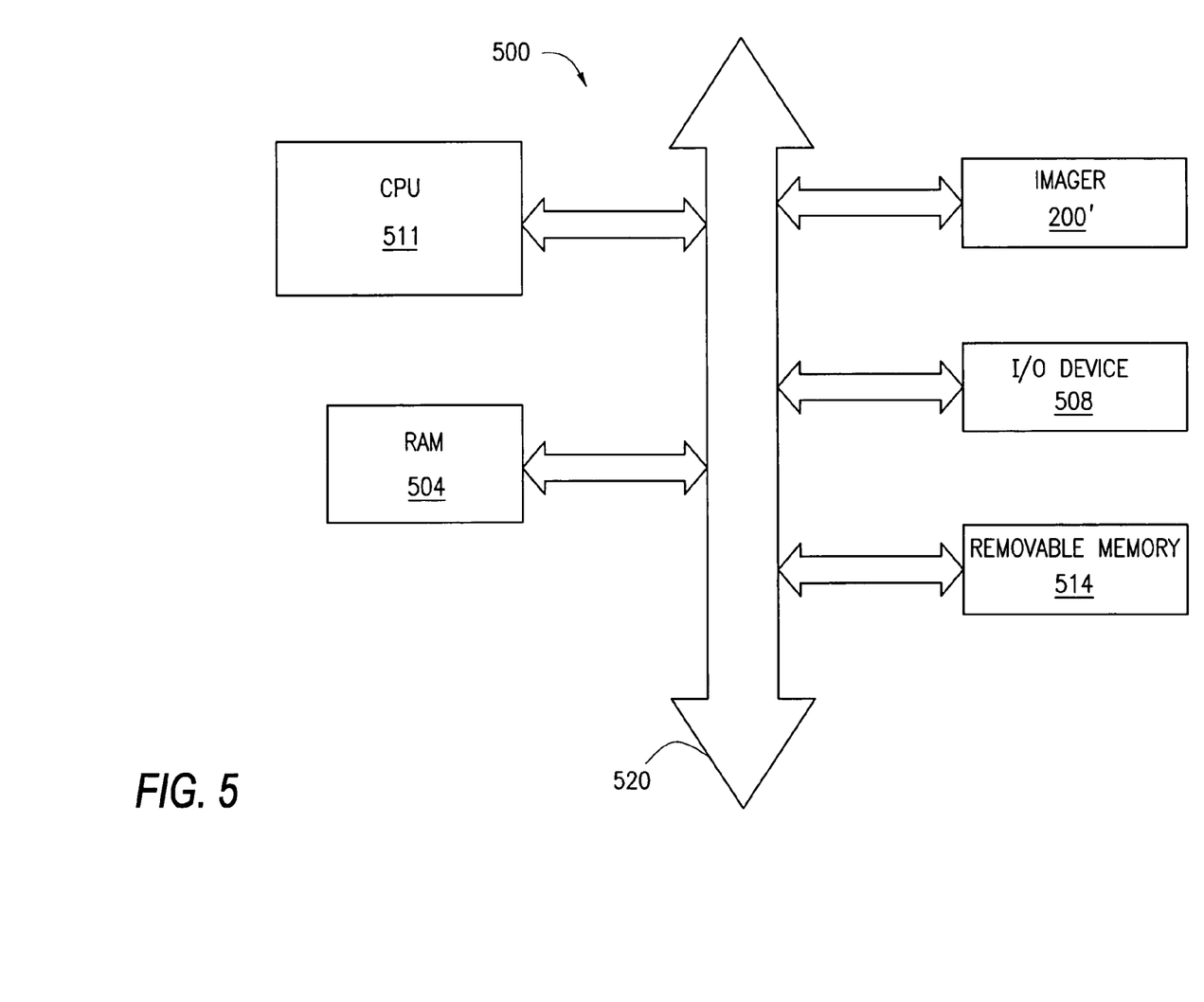
FIG. 5 illustrates a system incorporating the imager of FIG. 4.

FIG. 5 shows system 500, a typical processor system modified to include an imager 200' (FIG. 4) of the invention. The system 500 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 500, for example a camera system, generally comprises a central processing unit (CPU) 511, such as a microprocessor, that communicates with an input/output (I/O) device 506 over a bus 520. Imaging device 200' also communicates with the CPU 511 over the bus 520. The system 500 also includes random access memory (RAM) 504, and can include removable memory 514, such as flash memory, which also communicate with the CPU 511 over the bus 520. The imager 200' may be combined with a processor, such as a CPU, digital signal processor, or microprocessor, with or without memory storage on a single integrated circuit or on a different chip than the processor.

The present invention is therefore directed to a pixel architecture having an electronic shutter comprising a shutter transistor and a pinned diode. The pinned diode is used as a charge storage device to permit every pixel of the array to image simultaneously. The shutter transistor is used, in conjunction with the transfer transistor, to controllably isolate the imaged charge from the floating diffusion (node E). This permits the pixels output signals to be processed by the image processor in a conventional manner. Preferably, the transfer transistor and shutter transistor of any pixel are never simultaneously in a conducting state.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

The invention claimed is:

1. A pixel, comprising:
   a light sensitive element for generating photo generated charge;
   an electronic shutter circuit for receiving charge from said light sensitive element, said electronic shutter circuit comprising:
   a pinned diode charge storage element; and
   a shutter control element, said shutter control element having a shutter control input coupled to said light sensitive element and an output coupled to said pinned diode charge storage element;
   a floating diffusion node;
   a transfer control element for transferring charge from said pinned diode charge storage element to said floating diffusion node;
   a reset circuit for resetting said floating diffusion node; and
   a readout circuit for reading out charges stored at said floating diffusion node.

2. The pixel of claim 1, wherein said pinned diode charge storage element is a pinned photodiode.

3. The pixel of claim 2, further comprising:
   a light shielding element arranged to shield said pinned photodiode from substantially all light incident upon said light sensitive element.

4. The pixel of claim 1, wherein said light sensitive element is a photodiode.

5. The pixel of claim 4, wherein said light sensitive element is a pinned photodiode.

6. The pixel of claim 1, wherein said transfer control element is a transistor having one source/drain coupled to said electronic shutter circuit and another source/drain coupled to said floating diffusion node.

7. The pixel of claim 1, wherein said shutter control element is a transistor having one source/drain coupled to said charge storage element and another source/drain coupled to said pinned diode light sensitive element.

8. An imager, comprising:
   a pixel array, said pixel array comprising a plurality of pixels organized into a plurality of rows and a plurality of columns, at least one of said plurality of pixels comprising:
   a light sensitive element for generating photo generated charge;
   an electronic shutter circuit for receiving charge from said light sensitive element, said electronic shutter circuit comprising:
   a pinned diode charge storage element; and
   a shutter control element, said shutter control element having a shutter control input coupled to said light sensitive element and an output coupled to said pinned diode charge storage element;
   a floating diffusion node;
   a transfer control element for transferring charge from said pinned diode charge storage element to said floating diffusion node;
   a reset circuit for resetting said floating diffusion node; and
   a readout circuit for reading out charges stored at said floating diffusion node;
   an image processing circuit for receiving signals from said plurality of pixels;
   a pixel selecting circuit, coupled to said pixel array, for controllably coupling different ones of said plurality of pixels in said pixel array to said image processing circuitry; and
   a control circuit, for operating said pixel selecting circuit to transfer signals from each of said pixels to said image processing circuit, and for controlling said electronic shutter circuit of said at least one of said plurality of pixels.

9. The imager of claim 8, wherein said pinned diode charge storage element is a pinned photodiode.

10. The imager of claim 9, further comprising:
    a light shielding element arranged to shield said pinned photodiode from substantially all light incident upon said light sensitive element.

11. The imager of claim 8, wherein said light sensitive element is a photodiode.

12. The imager of claim 11, wherein said light sensitive element is a pinned photodiode.

13. The imager of claim 8, wherein said transfer control element is a transistor having one source/drain coupled to said electronic shutter circuit and another source/drain coupled to said floating diffusion node.

14. The imager of claim 8, wherein said shutter control element is a transistor having one source/drain coupled to said pinned diode charge storage element and another source/drain coupled to said light sensitive element.

15. A method of operating an imager having a plurality of pixels, each pixel of said plurality of pixels including an electronic shutter circuit, the method comprising:
    in each pixel of said plurality of pixels:
    selectively electrically coupling a pinned diode charge storage element to a stream of photo generated charges produced by a light sensitive element exposed to incident light;
    storing said stream of photo generated charges at said pinned diode charge storage element when said pinned diode charge storage element is electrically coupled to said light sensitive element;
    selectively electrically coupling said pinned diode charge storage element to a floating diffusion node;
    storing said stream of photo generated charges at said floating diffusion node when said floating diffusion node is electrically coupled to said pinned diode charge storage element;

selectively coupling said floating diffusion node to an output line using readout circuitry; and
selectively coupling said floating diffusion node to a reset voltage.

16. The method of claim 15, wherein said pinned diode charge storage element is coupled to said floating diffusion node when said pinned diode charge storage element is not electrically coupled to said light sensitive element.

17. The method of claim 15, wherein said pinned diode charge storage element is a pinned photodiode and said method further comprises shielding said pinned photodiode from substantially all of said incident light.

18. A system, comprising:
a processing element; and
an imager coupled to said processing element, said imager comprising:
a pixel array, said pixel array comprising a plurality of pixels organized into a plurality of rows and a plurality of columns, each of said pixels comprising:
a light sensitive element for generating photo generated charge;
an electronic shutter circuit for receiving charge from said light sensitive element, said electronic shutter circuit comprising:
a pinned diode charge storage element; and
a shutter control element, said shutter control element having a shutter control input coupled to said light sensitive element and an output coupled to said pinned diode charge storage element;
a floating diffusion node;
a transfer control element for transferring charge from said pinned diode charge storage element to said floating diffusion node;
a reset circuit for resetting said floating diffusion node; and
a readout circuit for reading out charges stored at said floating diffusion node;
an image processing circuit for receiving signals from said plurality of pixels;
a pixel selecting circuit, coupled to said pixel array, for controllably coupling different ones of said plurality of pixels in said pixel array to said image processing circuitry; and
a control circuit, for operating said pixel selecting circuit to transfer signals from each of said pixels to said image processing circuit, and for controlling said electronic shutter circuit of each of said plurality of pixels.

19. The system of claim 18, wherein said pinned diode charge storage element is a pinned photodiode.

20. The system of claim 19, further comprising:
a light shielding element arranged to shield said pinned photodiode from substantially all light incident upon said light sensitive element.

21. The system of claim 18, wherein said light sensitive element is a photodiode.

22. The system of claim 21, wherein said light sensitive element is a pinned photodiode.

23. The system of claim 18, wherein said transfer control element is a transistor having one source/drain coupled to said electronic shutter circuit and another source/drain coupled to said floating diffusion node.

24. The system of claim 18, wherein said shutter control element is a transistor having one source/drain coupled to said pinned diode charge storage element and another source/drain coupled to said light sensitive element.

25. An imager, comprising:
a pixel array comprising a plurality of pixels arranged into a plurality of rows, each pixel of said plurality of pixels including a light sensitive element, an in-pixel shutter circuit including a pinned diode charge storage element for receiving charge from said light sensitive element, a floating diffusion node, a transfer transistor for transferring charge from said pinned diode charge storage element to said floating diffusion node, a reset circuit for resetting said floating diffusion node, and readout circuitry for reading out charge stored at said floating diffusion node, and
a control circuit for controlling said plurality of pixels, wherein
said control circuit simultaneously causes the in-pixel shutter circuit in each pixel of said plurality of pixels to conduct, and
said control circuit controls a conductivity of said transfer transistor of said pixels on a row-by-row basis.

26. The imager of claim 25, wherein in each pixel, said in-pixel shutter circuit comprises:
a shutter control transistor; and
said pinned diode charge storage element,
wherein said shutter control transistor includes one source/drain coupled to said light sensitive element and another source/drain coupled to said pinned diode charge storage element.

27. The imager of claim 25, wherein said pinned diode charge storage element is a pinned photodiode.

28. The imager of claim 25, wherein said pinned diode charge storage element is shielded from substantially all incident light.

29. A method for fabricating an imaging device, comprising:
providing a pixel array comprising a plurality of pixels arranged into a plurality of rows, each pixel of said plurality of pixels including a light sensitive element, an in-pixel shutter circuit including a pinned diode charge storage element for receiving charge from said light sensitive element, a floating diffusion node, a transfer transistor for transferring charge from said pinned diode charge storage element to said floating diffusion node, a reset circuit for resetting said floating diffusion node, and readout circuitry for reading out charge stored at said floating diffusion node; and
providing a control circuit for controlling said plurality of pixels, wherein
said control circuit simultaneously causes the in-pixel shutter circuit in each pixel of said plurality of pixels to conduct, and
said control circuit controls a conductivity of said transfer transistor of said pixels on a row-by-row basis.

30. The imager of claim 8, said at least one of said plurality of pixels comprising more than one of said plurality of pixels, wherein said control circuit is configured to provide a global shutter signal to each of said shutter control elements in said pixel array.

31. The method of claim 15, wherein selectively electrically coupling a pinned diode charge storage element to a stream of photo generated charges further comprises electrically coupling said pinned diode charge storage elements in each pixel of said plurality of pixels to said respective light sensitive elements at the same time.

32. The system of claim 18, wherein said control circuit is configured to provide a global shutter signal to each of said shutter control elements in said pixel array.

33. The method of claim 29, wherein said in-pixel shutter circuit includes a shutter control element and said pinned diode charge storage element, said method further comprising shielding said pinned diode charge storage element of said in-pixel shutter circuits from substantially all incident light.

* * * * *